United States Patent
Singh et al.

(10) Patent No.: US 9,466,138 B2
(45) Date of Patent: Oct. 11, 2016

(54) ATTRIBUTE-BASED STACKING FOR DIAGRAMS

(71) Applicant: Oracle International Corporation, Redwood Shores, CA (US)

(72) Inventors: Prashant Singh, Lexington, MA (US); Jairam Ramanathan, Waltham, MA (US); Brendon Glazer, Everett, MA (US); Kris Hanson, Stoneham, MA (US); Lory D. Molesky, Lexington, MA (US); Mark E. Robertson, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 13/905,609

(22) Filed: May 30, 2013

(65) Prior Publication Data

US 2014/0354650 A1    Dec. 4, 2014

(51) Int. Cl.
    *G06T 11/20*      (2006.01)
    *G06F 3/048*      (2013.01)
    *H04L 12/24*     (2006.01)
    *G06F 9/44*       (2006.01)

(52) U.S. Cl.
    CPC ............. *G06T 11/206* (2013.01); *G06F 3/048* (2013.01); *G06F 8/10* (2013.01); *G06F 8/34* (2013.01); *H04L 41/22* (2013.01)

(58) Field of Classification Search
None
See application file for complete search history.

(56) References Cited

U.S. PATENT DOCUMENTS

2003/0110191 A1* 6/2003 Handsaker et al. .......... 707/503
2007/0171716 A1* 7/2007 Wright et al. ........... 365/185.12
2008/0307335 A1* 12/2008 Chaudhri et al. ............. 715/764
2010/0182321 A1* 7/2010 Cartan .......................... 345/440
2012/0229466 A1* 9/2012 Riche et al. .................. 345/440

OTHER PUBLICATIONS

Pombinho, Paulo, Maria Beatriz Carmo, and Ana Paula Afonso. "Evaluation of overcluttering prevention techniques for mobile devices." Information Visualisation, 2009 13th International Conference. IEEE, 2009.*
Henry, Nathalie, Jean-Daniel Fekete, and Michael J. McGuffin. "NodeTrix: a hybrid visualization of social networks." Visualization and Computer Graphics, IEEE Transactions on 13.6 (2007): 1302-1309.*
J.-D. Fekete. The InfoVis Toolkit. In Proceedings of the 2004 IEEE Symposium on Information Visualization (INFOVIS'04), pp. 167-174. IEEE Computer Society, 2004.*

* cited by examiner

Primary Examiner — Sultana M Zalalee
(74) Attorney, Agent, or Firm — Trellis IP Law Group, PC

(57) ABSTRACT

A system and method for facilitating adjusting a displayed representation of a visualization. An example method includes displaying a first visualization that includes plural nodes; providing a first user option to specify a first node attribute; and stacking nodes of the first visualization based on the first node attribute, resulting in display of one or more stacks of nodes. In a more specific embodiment, one or more links connect one or more of the plural nodes to one or more other nodes of the plural nodes. The method further includes adjusting the first visualization to illustrate the one or more stacks of nodes, while preserving any links, resulting in display of a second visualization in response thereto. The step of adjusting further includes animating a transition between display of the first visualization and display of the second visualization.

20 Claims, 12 Drawing Sheets

ATTRIBUTE-BASED STACKING FOR DIAGRAMS

CROSS REFERENCES TO RELATED APPLICATIONS

This application is related to the following applications, U.S. patent application Ser. No. 13/688,010, entitled COMPRESSING TREE DIAGRAMS, filed on Nov. 28, 2012, which is hereby incorporated by reference, as if set forth in full in this specification.

BACKGROUND

The present application relates to software and more specifically to user interface designs and methods for manipulating information visualizations, such as network diagrams.

Visualizations are employed in various demanding applications, including enterprise resource planning, scientific research, financial data analysis, computer network topology design, social network analysis, and so on. Such applications often involve large datasets, of which a portion or all of the data may be incorporated into a visualization. The data may include patterns and other characteristics that may be illustrated via a visualization. Such applications often demand particularly illustrative visualizations that can reveal patterns and information in the data and that may be manipulated to enable users to quickly ascertain desired information.

Illustrative visualizations are particularly important in social network analysis, computer network topology design, and enterprise data applications, where multiple attributes, patterns, and complex phenomena may exist in granular data to be illustrated via a visualization. Complex underlying data may yield large unwieldy visualizations, with potentially hundreds or thousands of nodes and links, which may not fit within a single display area, especially when mobile devices, such as tablets and smartphones, are used to display the visualizations on relatively small displays. Connections and relationships between different types of nodes may be unclear, and important data patterns may be hidden among diagram complexity.

Conventionally, complex visualizations and accompanying user interfaces may provide certain features, such as panning, zooming, summarizing, and filtering features, for manipulating the visualizations. However, such features typically provide incomplete perspectives or views of the underlying data, where important relationships between nodes are hidden or obscured, and overall context is lost.

To reduce diagram complexity, container nodes may be employed. A container node may represent a summary node that includes several components. For example a node in a computer network diagram representing a server cluster may represent a container node that includes individual server components. However, use of container nodes to reduce diagram complexity may limit operations that can be performed on container node components, as container node components typically must remain with the container node. Furthermore, important data patterns may remain hidden.

Hence, conventional visualizations and accompanying techniques and user interfaces may lack effective mechanisms for selectively reducing complexity of potentially overwhelmingly complex visualizations while preserving and illustrating important data patterns and relationships.

SUMMARY

An example method for facilitating adjusting a visualization includes displaying a first visualization that includes plural nodes; providing a first user option to specify a first node attribute; and stacking nodes of the first visualization based on the first node attribute, resulting in display of one or more stacks of nodes.

In a more specific embodiment, one or more links connect one or more of the plural nodes to one or more other nodes of the plural nodes. The method further includes adjusting the first visualization to illustrate the one or more stacks of nodes, while preserving the one or more links, resulting in display of a second visualization in response thereto. The step of adjusting further includes animating a transition between display of the first visualization and display of the second visualization.

In an illustrative embodiment, the method further includes providing a second user option to specify a second node attribute; grouping nodes of the first visualization in accordance with the first node attribute and the second node attribute; and displaying a third visualization, which represents the first visualization after nodes have been stacked in accordance with the first attribute and the second attribute.

The method may further include displaying an indication of a number of nodes included in a stack of the second and/or third visualization. The indication may include a label and/or varying stack height, which is varied based on a number of nodes included in the stack. Another indication, such as a link label, may indicate a number of links connecting one or more stacks and/or nodes of the third visualization.

The method may further include providing a user option to trigger a software action pertaining to one or more nodes of a stack. The software action may include, for example, generating a fourth visualization based on information associated with the one or more nodes of the stack. The fourth visualization may include, for example, a bar chart depicting performance, salary, or other metric(s) of individual persons associated with individual nodes of the stack. Additional actions include sorting, expanding, or flipping through nodes of the stack.

The method may further include providing a user option to overlay one or more stacks of a second, third, or fourth visualization on the first visualization, while depicting one or more links indicating where one or more of the nodes of the stack were originally positioned in the first visualization. The first node attribute and the second node attribute may be visually encoded, e.g., by color, shape, size, etc., in one or more nodes of the first visualization. The visual encoding for each visually encoded node may be preserved between the different visualizations.

The various visualizations may include network diagrams, maps, N-box visualizations, and so on. For example, the first visualization may include a map with one or more nodes, wherein the first node attribute includes geographical information, such as state or other region, and/or a metric associated with one or more persons represented by one or more nodes displayed on the map.

Hence, by enabling stacking of nodes in a visualization based on a user-specified attribute, certain embodiments discussed herein enable substantial reductions in visualization complexity while enabling flexible and efficient viewing of particular relationships that may exist between individual nodes and node stacks.

By enabling user control over visualization complexity, users can dramatically simplify complex confusing diagrams while maintaining knowledge of interrelationships between nodes, and without necessitating underlying data model changes. User options for selectively creating stacks based on various attributes; user options for manipulating stacks (e.g., unstacking, exploding, tiling, cascading, and so on); and user options for performing stack operations (e.g., flipping, shuffling, sorting, and so on), provide synergistic functionality for extracting sought information from data underlying a visualization.

A further understanding of the nature and the advantages of particular embodiments disclosed herein may be realized by reference of the remaining portions of the specification and the attached drawings.

DETAILED DESCRIPTION OF EMBODIMENTS

Figure 1:
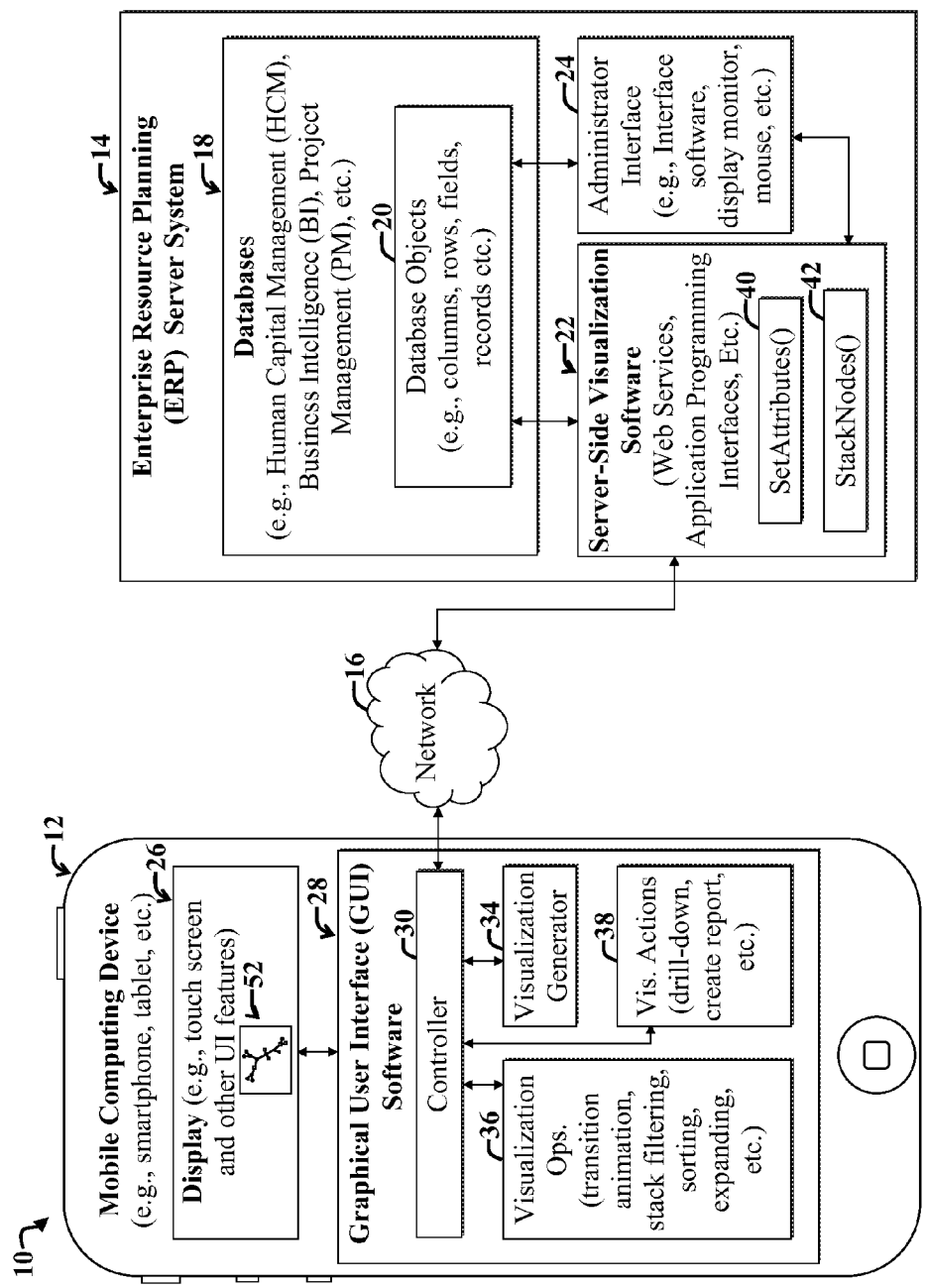
FIG. 1 is a diagram illustrating an example enterprise computing environment and accompanying system for facilitating displaying and manipulating visualizations, such as by stacking nodes according to specified criteria.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, N-boxes, maps with data layers, and so on.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via a graphical depiction, such as a node of a visualization, a menu item, dialog box, personnel icon, and so on. The graphical depiction of an object may also be called an object, a displayed object, or a node.

Generally, a node may be any graphical representation of an object in a visualization. Note that certain nodes may include sub-nodes, just as an object may include or represent additional objects, i.e., sub-objects.

For the purposes of the present discussion, a data attribute (also simply called attribute herein) may be any value or property characterizing data. Accordingly, an attribute of a visualization, node, or associated data, may refer to any characteristic of data used to generate a visualization or any characteristic of a visualization representing a characteristic of the data. The data characteristic and/or visualization characteristic may be employed to group or otherwise organize or visually distinguish the data by adjusting features or characteristics of the visualization. Examples of attributes include data dimensions or layers, such as specified by row or column headers of tables used to store the data used for a visualization.

Hence, a node attribute may be any characteristic of a node or any information associated with the node. A node attribute may include a characteristic of underlying data and/or may include a visual attribute.

A visual attribute may be associated with or mapped to an underlying node attribute. For example, a node representing a female employee may include a particular shape (visual attribute) that is associated with the underlying data (e.g., data attribute) indicating that node represents a female.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include an employee record, a product record, and so on. Examples of data that may be included in an object include employee name and address information, job role, performance ratings, project or task information, appointment records, and so on. An example of functionality that may be associated with or included in an object includes software functions or processes for issuing a reminder for an appointment.

In various embodiments discussed herein, to facilitate conveying information, visual properties of a node can be varied in accordance with a data attribute (also simply called attribute herein) characterizing the underlying object, i.e., data, thereby visually encoding the attribute.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

FIG. 1 is a diagram illustrating an example enterprise computing environment and accompanying system 10 for facilitating displaying and manipulating visualizations, such as by stacking nodes of a network diagram 52 according to specified criteria.

For the purposes of the present discussion, a node stack may be any group of overlapping nodes. A first node is said to overlap a second node when a boundary of the first node appears to encroach on a boundary of the second node. Hence, conceptually, stacks may represent a group of nodes that are stacked on top of one another. Stacks can be rendered by displaying a single constituent node with some adornment to indicate that the node represents a stack rather than a single node (e.g., including the number of nodes that make up the stack). When nodes are stacked, the links connecting to the constituent nodes are rendered as connecting to the stack.

The example system 10 includes a mobile computing device 12, such as a smartphone, tablet, or other device, in communication with an ERP server system 14 via a network 16, such as the Internet. The ERP system 14 includes various databases 18, which store database objects 20.

Note that while the present embodiment is discussed as employing a mobile computing device as a client device that communicates with an ERP server, embodiments are not limited thereto. For example, functionality need not be distributed across a network and/or need not employ an ERP server. Certain embodiments may be implemented as a single software application running on a single computing device, without departing from the scope of the present teachings.

In the present example embodiment, server-side software 22, such as web services, Application Programming Interfaces (APIs), and so on, may communicate with database objects 20 maintained by the ERP databases 18 to selectively employ data thereby, such as to facilitate implementation of various software applications, which may include server-side and client-side software applications. Generally, server-side implementations involve running applications on the ERP server 14 in response to a request from a client, such as the mobile computing device 12. Server-side applications may then send data and/or instructions back to the client device 12. In client-side implementations, software may be downloaded to the mobile computing device 12 and executed locally on the device 12.

The example ERP server system 14 includes an administrator user interface 24, which may include hardware and software functionality for enabling an administrator to make changes to various components of the ERP server system 14, such a settings, installed software, and so on.

The mobile computing device 12 represents an example client device that communicates with the server-side visualization software 22. Note that client devices other than mobile computing devices, such as desktop client devices, may be employed without departing from the scope of the present teachings.

The mobile computing device 12 employs a relatively small touch screen 26 (also simply called a display herein) in communication with Graphical User Interface (GUI) software 28, which is adapted to facilitate displaying one or more visualizations 52 via the touch screen 26. The GUI software 28 may be any software application or component, such as a spread sheet program, graphing software, and so on, that is adapted to facilitate displaying graphical user interface features and/or data, such as graphs, menu items, dialog boxes, and so on.

The example GUI software 28 includes a controller 30 in communication with a visualization generator 34, a visualization actions module 38, and a visualization operations module 36. The controller 30 includes computer code for coordinating inputs and outputs to and from the modules 34-38 and interfacing the GUI software 28 and accompanying modules 34-38 with the server-side visualization software 22.

In operation, a user may employ the mobile computing device 12 to browse to a website hosted by the ERP server system 14, which provides access to the server-side visualization software 22 and accompanying database objects 20. The controller 30 may facilitate downloading database objects 20 from the ERP server system 14 and server-side visualization software 22 for use in constructing a visualization 52 to be displayed via the touch screen 26. Alternatively, the data remains in the databases 18, and information needed to render corresponding visualizations is provided by the server-side visualization software 22.

In the present example embodiment, the GUI software 28 is adapted to selectively download database objects 20 from the ERP server system 18. The visualization generator 34 then employs client-side visualization-generating software to construct one or more visualizations in accordance with instructions included in the controller 30 and input from the touch screen 26.

Initial or default methods and algorithms for organizing nodes into stacks of a visualization based on a stacking criteria or attribute; for sorting nodes within a stack; for encoding any data attributes (e.g., attributes of the database objects 20) via node characteristics (e.g. node size, color, shape, and so on) may be initially determined by the GUI software 28.

The controller 30 may facilitate implementing GUI components and user interface controls to provide user options to adjust attribute encoding, as discussed more fully below. Alternatively, or in addition, attributes (i.e., attributes of data used to generate a visualization) are automatically encoded, such as in accordance with space constraints inherent in a display; numbers of nodes to be illustrated, and so on. For example, in certain implementations, nodes of a visualization are initially automatically stacked to reduce visualization size as the size and/or resolution of the display used to illustrate the visualization decreases.

Key functionality for adjusting displayed characteristics of a visualization may be included in various functions (e.g., a SetAttributes( ) function 40 and a StackNodes( ) function 42) of the server-side visualization software API 22. The example functions 40, 42 may be called remotely via the visualization generator 34 and controller 30 as needed in response to certain user input, or automatically in accordance with instructions included in the controller 30. Alternatively, the functions 40, 42 may be downloaded to the mobile computing device 12 and run client-side.

Note that the server-side visualization software 22 may include additional functionality other than that represented by the example functions 40, 42. For example, functions for facilitating sorting nodes in a node stack; flipping or repositioning a node of a node stack; expanding a stack (such as by tiling, exploding or spreading, reorienting into a filmstrip visualization, and so on); animating node stacking operations, and so on, may be implemented via the server-side visualization software 22 or may be implemented client-side via the GUI software 28.

Those skilled in the art with access to the present teachings may readily develop software to implement functionality discussed herein to meet the needs of a given implementation, without undue experimentation.

Page: 11 For the purposes of the present discussion, software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

The example SetAttributes( ) function 40 of the server-side software 22 may include computer code for adjusting visual attributes of nodes of a visualization and for associating the visual attributes with data attributes in response to user input, as discussed more fully below. The SetAttributes( ) function 40 may include additional computer code for facilitating attribute mapping, whereby, for example, user-specified node stacking attributes are mapped to or associated with visual attributes, which are in turn associated with underlying data attributes. For example, if visual attributes, such as size, shape, or color, are associated with different underlying data attributes, the node stacking attributes may represent subsets or sub-attributes (also called attribute values herein) associated with each underlying data attribute.

In certain embodiments, visual attributes, such as shape, color, etc., of different nodes may be predetermined (e.g., initially set to default visual attributes) by the visualization generator 34 of the GUI software 28 or by the server-side SetAttributes( ) function 40. For example, certain groupings or underlying data (characterized by a given data attribute) may be represented by predetermined shapes and/or colors in an initial visualization. In such embodiments, additional user options may be provided via one or more user interface controls presented via the display 26 to enable users to specify or set node stacking attributes to enable stacking or grouping of nodes based on underlying data attributes and/or associated visual attributes of a diagram or other visualization, as discussed more fully below. The user interface controls may be generated via the GUI software 28.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Touch input may be any input, such as input via a gesture, provided to a computing device via a touch-sensitive display. A gesture may be any movement that involves motion to trigger a signal to control or otherwise affect a user interface display screen.

The example StackNodes( ) function 42 may include computer code for receiving indications of user specified node stacking attributes, also called stacking criteria herein, and calling the server-side visualization software 22 to retrieve instructions for stacking nodes of the visualization 52 and/or for redrawing the visualization 52 to show stacked nodes in accordance with the specified attributes. Such instructions may then be used by the visualization generator 34 to generate a diagram based on the received instructions. Note that such functionality, as well as other functionality discussed herein may alternatively be implemented entirely client-side.

In general, various modules shown in FIG. 1 may be combined into fewer modules or separated into additional modules, which may be implemented on a single device or more devices than shown, without departing from the scope of the present teachings.

In general, the server-side visualization software 22 includes computer code adapted to selectively retrieve data from the databases 18 in response to a request message from the GUI software 28 for use in constructing visualizations, such as the visualization 52. The data may be forwarded to the client-side GUI software 28 for representation on the display 26 as needed in response to client-side user input.

In certain implementations, underlying data of a visualization is maintained primarily in the databases 18 until needed to adjust a visualization, e.g., to stack nodes thereof; to facilitate drill-down operations, and so on. In other implementations, a local copy of underlying data represented by a visualization is retrieved from the databases 18 and stored locally on the client device, i.e., mobile computing device 12.

Note that while the example GUI software 28 is shown included in the mobile computing device 12, implementations are not limited thereto. For example, the GUI software 28 may be incorporated into the server-side visualization software 22 and run on the server 14 as a server-side application. The server side application may be run server-side and viewed client-side via browser software running on the mobile computing device 12.

In the present example embodiment, various GUI modules 34-38 include computer code for implementing functionality for adjusting how a visualization is displayed via the touch screen 26. Example operations, which may be implemented in part via the visualization operations module 36, include animating a transition of the visualization 52 from a first state to a second state, where the second state includes stacked nodes; filtering or removing stacks from a visualization based on a user specified criteria or action; flipping through nodes of a stack or repositioning nodes in a stack; expanding a stack, such as by spreading to tiling nodes of a stack; merging two or more stacks into a single stack; displaying a stack as a filmstrip visualization element; sorting nodes of a stack based on a given criterion or criteria; adjusting node appearance based on a given node-appearance criterion or criteria; scaling the size of a stack or of the entire visualization; repositioning stacks and/or nodes of the visualization 52, and so on.

Example visualization actions, i.e., software actions, which may be implemented in part via the visualization actions module 38 include generating a report or graphic based on one or more selected node stacks of the visualization 52; drilling down into a stack to display additional details of data underlying a node or stack of the visualization 52; updating or editing data in a database; changing types of or characteristics of displayed visualizations; launching another ERP software application, and so on.

For the purposes of the present discussion, a software action, also simply called action herein, may be any process or collection of processes implemented via software. Example processes implemented via the visualization actions module 38 include triggering display of additional details of a data object represented via a node of the visualization 52 (i.e., implementing drill-down operations) in response to certain user input (such as a tap gesture applied to a displayed ring or node); drilling-down to cause display of additional detail associated with a section of a visualization; zooming in on a particular portion of a visualization; triggering generation and display of a cross-tabular report illustrating data underlying a particular section of a visualization; updating or editing data in a database; changing types of or characteristics of displayed visualizations; launching another ERP software application, and so on.

Figure 2:
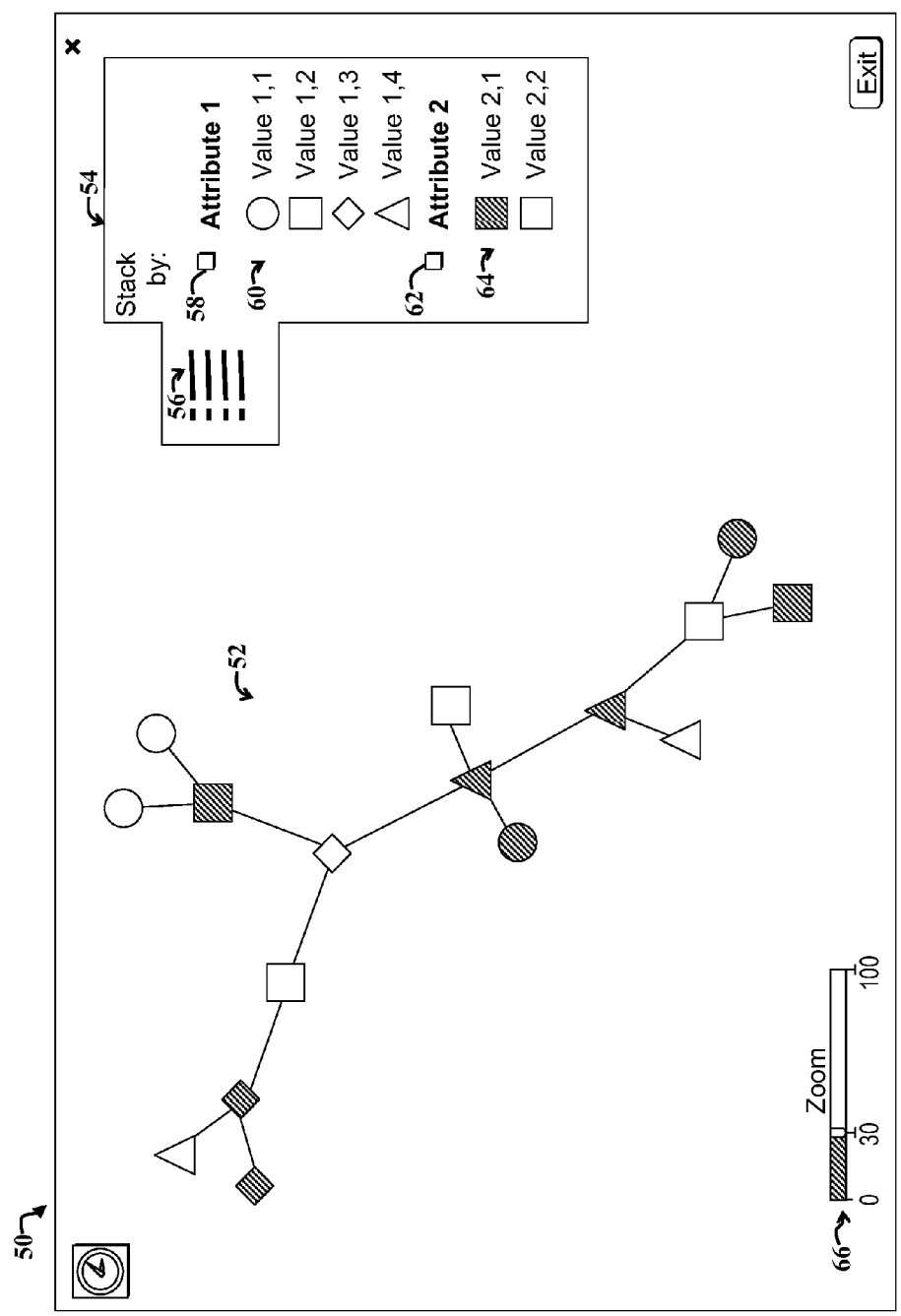
FIG. 2 shows a first example user interface display screen illustrating a first example network diagram, which may be implemented via the system of FIG. 1.

FIG. 2 shows a first example user interface display screen 50 illustrating a first example network diagram, which may be implemented via the system 10 of FIG. 1. For the purposes of the present discussion, a network diagram may be any visualization depicting underlying data via one or more nodes and one or more links between the one or more nodes. The terms "network diagram" and "graph drawing" are employed interchangeably herein.

Underlying data may be any data used to generate a visualization, where nodes or components of the visualization may represent one or more objects, features, or other data characteristics. Hence, underlying data may include information or functionality represented by or corresponding to a node, including link information. For example, a node representing a person in an enterprise organizational chart may be associated with additional underlying data that includes, for example, employee job title, phone number, address, and so on.

A user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

In various embodiments discussed herein, to facilitate conveying information, visual properties of a node can be varied in accordance with a data attribute (also simply called attribute herein) characterizing the underlying object, i.e., data, thereby visually encoding the attribute. For example, if each node of a visualization is characterized by a performance value, then the shape, color, brightness, etc., of each node may be varied as a function of the performance value associated with the node.

The user interface display screen 50 illustrates an example visualization 52, representing a network diagram. The network diagram 52 includes nodes with various shapes corresponding to different visual attributes, including shape and color. Different links connect one or more nodes to one or more other nodes of the visualization 52.

Note that in certain embodiments, node links may also be visually encoded. For the purposes of the present discussion, visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node or associated link(s) in a visualization, the hierarchical position is said to be visually encoded via the node (or link) size, shape, color, or position, respectively.

Figure 8:
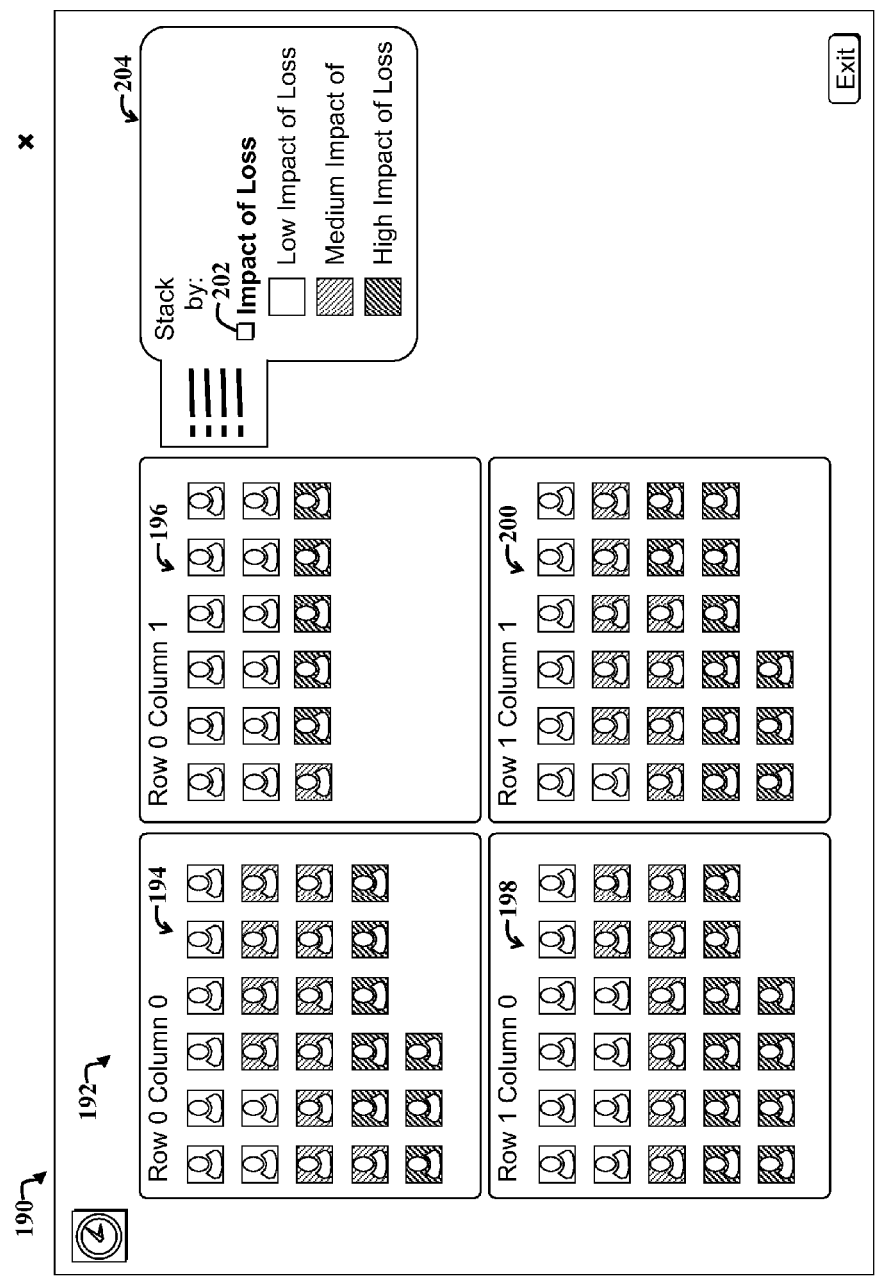
FIG. 8 shows a seventh example user interface display screen illustrating a first example N-box visualization, which may be implemented via the system of FIG. 1.

For the purposes of the present discussion, a link between a first node and a second node may be any association between nodes, either graphical and/or inherent in the data. For example, different nodes positioned on a map in a given region may be considered to be linked by the region, despite whether physical connecting lines representing links are shown. Furthermore, different nodes shown in different sections in FIG. 8 are said to be linked by row and column combination corresponding to different sections of the visualization 192 thereof.

Shape visual attributes are mapped by underlying software to particular values 60 or sub-attributes of a first attribute (Attribute 1) shown in a legend 54. Color visual attributes are mapped by underlying software to particular values 64 of a second attribute (Attribute 2). A legend expansion control 56 represents a user option to expand or collapse the legend 54 to hide or reveal contents thereof, respectively.

The legend 54 includes a first checkbox 58 adjacent to the name of the first attribute (Attribute 1) and a second check box 62 adjacent to the name of the second attribute (Attribute 2). The check boxes 58, 62 represent user options for stacking nodes of the network diagram 52 by the first attribute and/or second attribute, respectively, as discussed more fully below. For example, if a user checks the first check box 58, the diagram 52 is transformed in to a so-called stacked diagram, whereby nodes are stacked by shape, and whereby any links connecting the nodes are preserved, as discussed more fully below with reference to FIG. 3. Connecting links may be represented via link stacks. In a preferred embodiment, the transformation from the initial visualization 52 to another visualization is animated to show how the diagram is being rearranged, thereby helping to maintain visual context for the user.

The first attribute may represent, for example, employee job role, where each different node shape represents a different job role. The second attribute may represent, for example, gender, where different colors or shading distinguish between male and female employees. Note that other types and numbers of attributes and sub-attributes, i.e., attribute values, may be employed in a visualization without departing from the scope of the present teachings. Furthermore, different types of visualizations other than network diagrams may have their nodes stacked in accordance with user specified node stacking attributes, i.e., criteria, as discussed more fully below.

For illustrative purposes, a zoom slider bar 66 is provided for enabling user control over the scale of the displayed visualization 52, thereby enabling zooming in or zooming out on the visualization 52. Note that different and/or additional user interface controls may be provided, such as menus, buttons, and so on, for facilitating implementing various software actions and other functionality, without departing from the scope of the present teachings.

Figure 3:
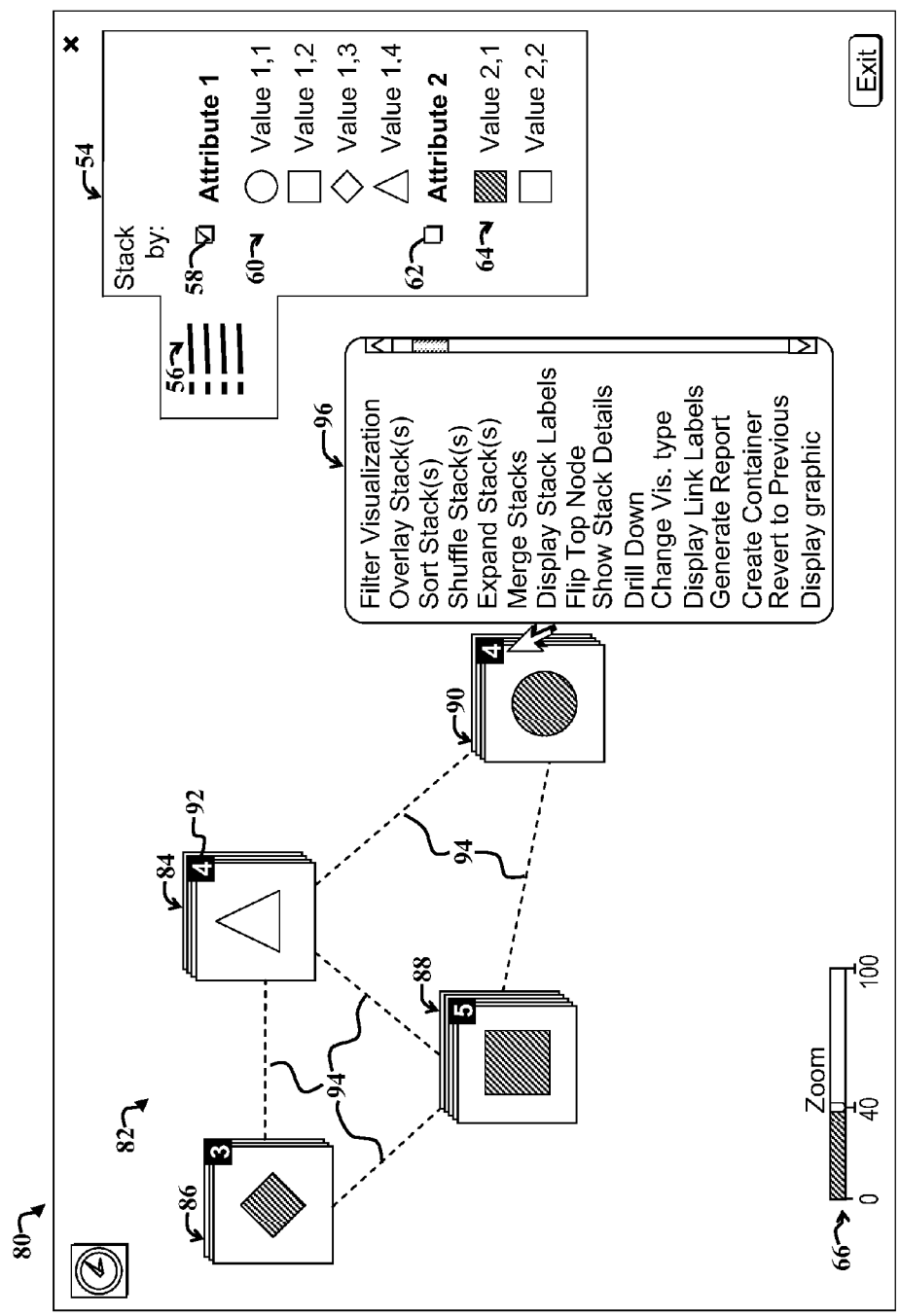
FIG. 3 shows a second example user interface display screen illustrating the network diagram of FIG. 2 after a user has specified node stacking criteria by selecting a first attribute.

FIG. 3 shows a second example user interface display screen 80 illustrating the network diagram 52 of FIG. 2 after a user has specified node stacking criteria by selecting the first attribute via the first check box 58, resulting in a second stacked network diagram 82. The second diagram 82 includes various node stacks 84-90, which represent the nodes of the network diagram 52 of FIG. 2 after the nodes have been stacked by shape, corresponding to various values 60 of the first attribute, as shown in the legend 54.

The node stacks 84-90 include a triangle stack 84, which includes all four triangular shaped nodes of the first visualization 52 of FIG. 2, as indicated by a first stack label 92. The numbers of nodes in a stack may be indicated by labels and/or by the visual appearance of the height of the stack, or via other mechanisms (e.g., via a hover layer, properties dialog box, etc.).

The various values 60, 64 of the first attribute and second attribute are said to represent stacking attributes. For the purposes of the present discussion, a stacking attribute may be any characteristic, metric, or other value or category used to create associations between nodes for grouping nodes into a stack. For example, in a network diagram that includes several blue nodes and several red nodes, node color may be used as a stacking attribute, whereby, for example, all blue nodes are combined into one stack and all red nodes are combined into another stack. When a user selects a stacking attribute or attributes, the user is said to select node stacking criterion or criteria, respectively. For example, the network diagram 82 is stacked by the stacking attributes associated with the first attribute, as indicated by the checked first checkbox 58.

Hence, a diamond stack 86 includes all three diamond shaped nodes of the visualization 52 of FIG. 2. Similarly, a square stack 88 includes all five square shaped nodes, and a circle stack 90 includes all circular shaped nodes.

Various links 94 connecting the stacks 84-90 illustrate connections between one or more nodes contained within each stack 84-90 to one or more nodes contained in another stack, such that links are preserved (also called promoted) during the stacking operation. Each of the links 94 may represent collections of one or more sub-links. The number of sub-links contained in or represented by a link may also be indicated by a label, as discussed more fully below with reference to FIG. 4.

The example second user interface display screen 82 further shows an example drop-down menu 96, which may be activated, for example, by right clicking on a node or node stack (or a collection of selected nodes or node stacks), such as the circle stack 90. The drop-down menu 96 includes various example user options for facilitating manipulating the visualization 82, triggering software actions, and so on. Example user options include a user option to filter the visualization; to overlay or overlap different stacks; to sort, shuffle, and merge stacks; to display or hide stack labels; to flip or reposition a top node of a stack; to show additional stack details; to drill down to display underlying stack and/or node data; to change visualization type; to display link labels; to generate a report based on one or more selected nodes or selected stacks; to create a container node from stack nodes (i.e., nodes of a stack); to revert to a previously displayed visualization; to display a graphic representative of data underlying one or more selected stacks; and so on.

Selection of one or more of the various user options provided in the example drop-down menu 96 may trigger display of additional dialog box(es) as needed to enable a user to specify additional information. For example, selection of a "Display Graphic" user option may trigger an additional dialog box with user interface controls and fields for enabling a user to specify what type of graphic to display and what information to use in the graphic. An example graphic includes a bar chart 112, as discussed more fully below with reference to FIG. 4.

Similarly, user selection of an "Expand Stack(s)" user option from the drop-down menu 96 may trigger display of an additional dialog box with features for enabling a user to select how a stack should be expanded, e.g., whether it should be tiled, converted into a filmstrip, and so on.

Alternatively, such user options shown in the drop-down menu 96 may be built into other user interface mechanisms. For example, in one implementation, a user may employ a computer mouse to click on a stack or may use a touch gesture to press on a stack and then drag or swipe a mouse cursor or finger across the surface of a stack to cause spreading of a stack. Spacing between nodes of an expanded stack may be adjusted by varying the length of the drag or swipe motion across the surface of the display screen 80.

For the purposes of the present discussion, a node stack, also simply called stack herein, is said to be expanded or unstacked if nodes thereof are tiled, spread (further separated), or the visual appearance of the stack is otherwise altered to reveal additional information or nodes associated with the stack that is not observed when the stack is in the unstacked state.

A stack is said to be flipped through if a top node of a stack is repositioned to reveal another node in the stack. In certain implementations, a particular node may be drilled into to display additional information associated with the node. In an example implementation, an animation may be employed to rotate the node to illustrate information appearing to be written on the back of a node. The information appearing on the back of a node may be further drilled into. However, in such cases, the node is said to be rotated rather than flipped.

Figure 4:
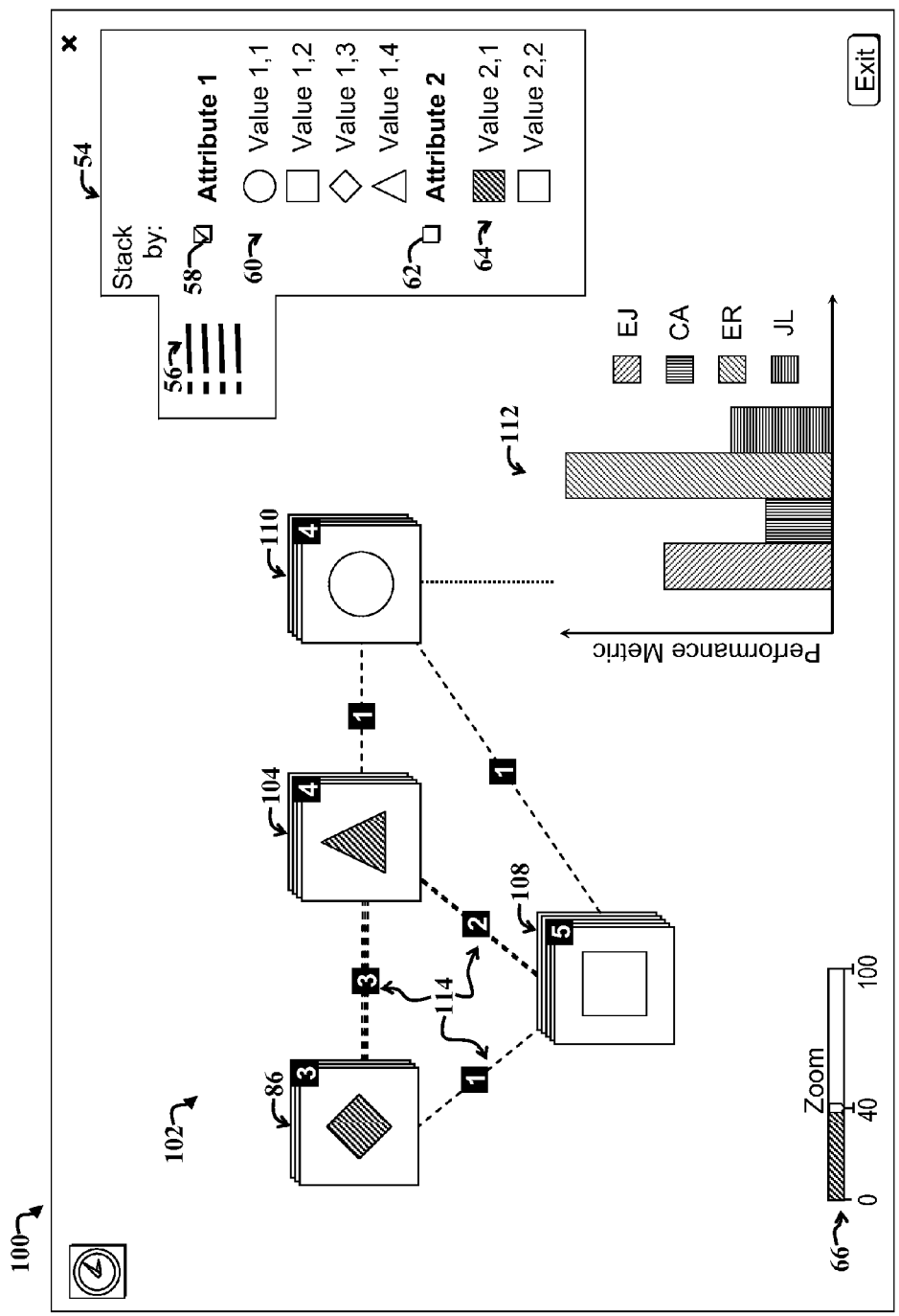
FIG. 4 shows a third example user interface display screen illustrating the network diagram of FIG. 3 after a user has flipped stacks, enabled display of link information, and repositioned stacks.

FIG. 4 shows a third example user interface display screen 100 illustrating the network diagram 82 of FIG. 3 after a user has flipped certain stacks (i.e., repositioned top nodes of different stacks 84, 88, 90), enabled display of link information 114, triggered display of a graphic 112, and repositioned stacks, such as by clicking and dragging a stack. The link information 114 is presented via link labels illustrating the number of connections between one or more nodes of connected stacks.

In general, such operations (e.g., flipping, displaying link information, and so on), may be triggered via user selection of one or more user options in the drop-down menu 96 of FIG. 3 and/or by other functionality, e.g., touch-screen functionality, afforded by features of the user interface and underlying software. Exact mechanisms and user interface controls for implementing such user options and associated functionality are implementation specific and may vary depending upon the implementation, without departing from the scope of the present teachings.

Various example operations applied to the second diagram 82 of FIG. 3 result in display of the updated second diagram 102 of FIG. 4. The node stacks 84-90 of the diagram 82 of FIG. 3 correspond to the node stacks 104, 86, 108, 110, respectively, of the updated second diagram 102 of FIG. 4.

In the present example embodiment, a "Flip Top Node" user option and a "Display Graphic" user option have been selected from the drop-down menu 96 of FIG. 3 and have been applied to the circle stack 90 thereof, resulting in display of an updated stack 110 and associated graphic 112 in FIG. 4. The resulting displayed graphic 112 includes, for example, a bar chart 112 plotting performance information (e.g., performance metric values) associated with each employee represented by a node of the updated circle stack 110. Note that other metrics, such as salary, seniority, time on the job, or other values associated with nodes may be incorporated into an auxiliary visualization, such as a bar chart, without departing from the scope of the present teachings. Furthermore, visualizations pertaining to one or more nodes in a stack are not limited to bar charts and may include other types of charts, graphs, diagrams or other visualizations, such as pie charts, sunburst visualizations, and so on.

Note that the top node of the updated stack 110 has changed color to reveal a different underlying node in response to a user "Flip Top Node" operation applied to the stack 90 of FIG. 3. Similarly, the top nodes of the triangle stack 204 and the square stack 108 have had their top nodes flipped relative to the corresponding stacks 84, 88 of FIG. 3.

Figure 5:
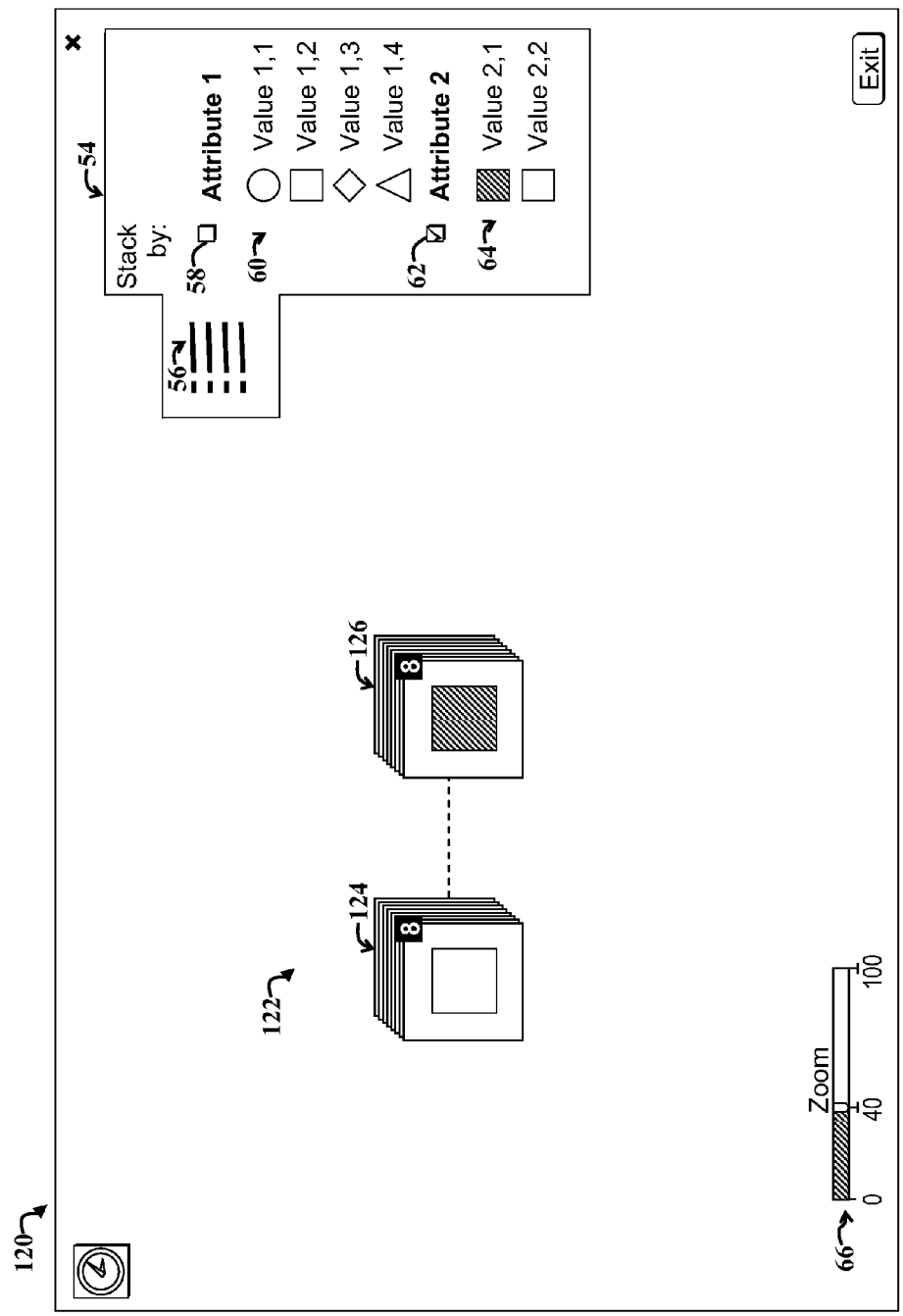
FIG. 5 shows a fourth example user interface display screen illustrating the network diagram of FIG. 2 after a user has specified node stacking criteria by selecting a second attribute.

FIG. 5 shows a fourth example user interface display screen 120 illustrating the network diagram 52 of FIG. 2 after a user has specified node stacking criteria by selecting a second attribute (via the second check box 62), resulting in display of an updated stacked diagram 122. The updated stack diagram 122 includes a first stack 124 and a second stack 126, which have been grouped and stacked by color or shading, such that all nodes of the first stack 124 are white nodes, and all nodes of the second stack 126 are dark nodes.

Figure 6:
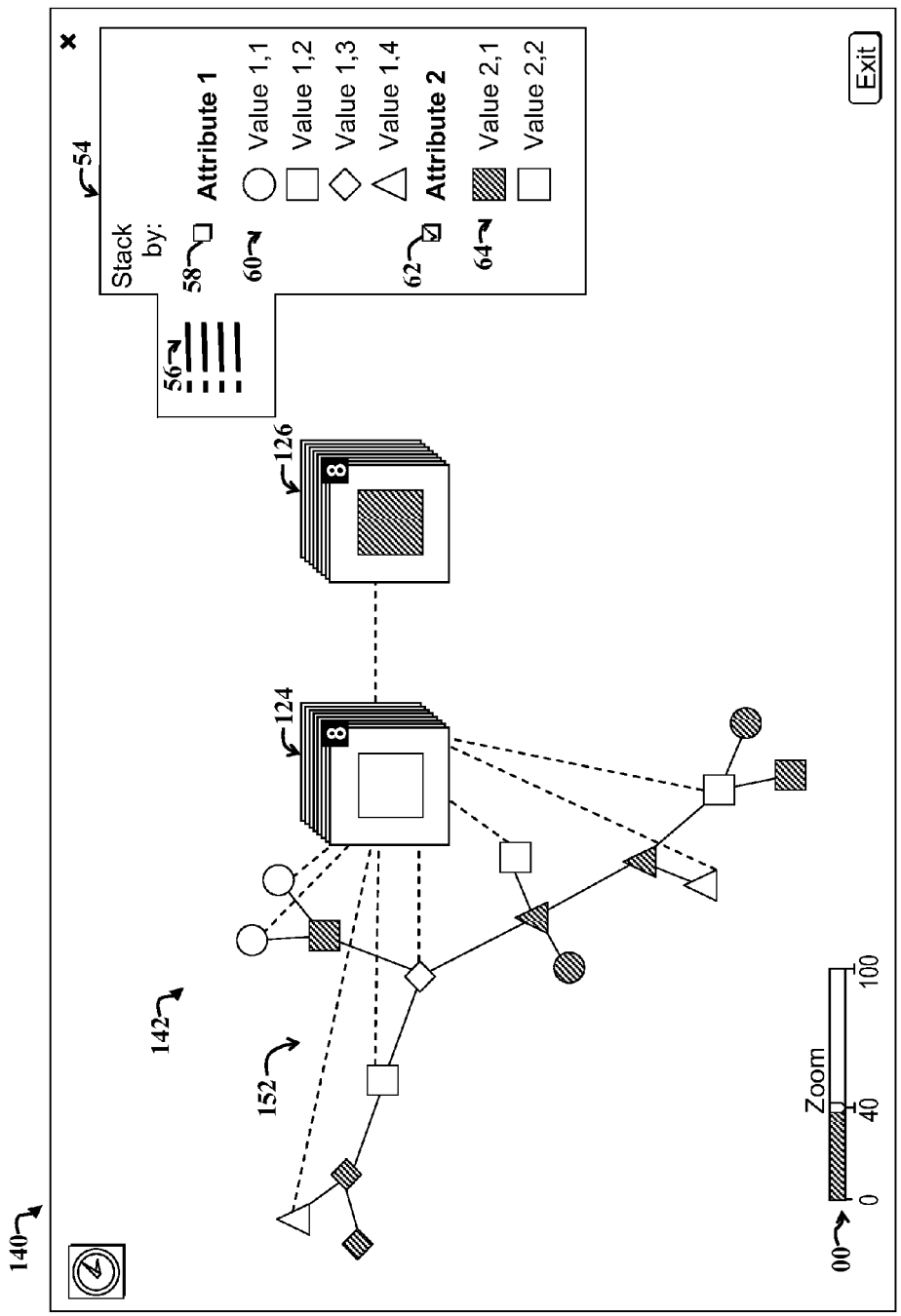
FIG. 6 shows a fifth example user interface display screen illustrating the network diagram of FIG. 5 after a user has selected a stack overlay feature from the drop-down menu of FIG. 3.

FIG. 6 shows a fifth example user interface display screen illustrating the network diagram 122 of FIG. 5 after a user has selected a stack overlay (i.e., "Overlay Stack(s)") feature, e.g., from the drop-down menu 96 of FIG. 3, resulting in display of an overlaid diagram 142.

User selection of the "Overlay Stack(s)" option may result in display of an additional dialog box, which may have additional user interface controls for enabling a user to specify which stack and/or accompanying node or nodes should be overlaid on the original diagram. In the present example embodiment, a user has chosen to overlay nodes of the first stack 124 on a representation 152 of the original diagram 52 of FIG. 2. The first stack is said to be overlaid on the representation 152 when connecting lines are shown from the first stack 124 to the original diagram representation 152 to illustrate where nodes of the stack 124 originated from in the original diagram 52 of FIG. 2. This feature facilitates illustrating contextual information, which may help reveal important information in underlying data and may help a user to understand interrelationships occurring between nodes in an original diagram.

Note that in certain implementations, where the original diagram is very complex, selectively stacking nodes and overlaying stacks may reveal otherwise difficult-to-see phenomena. For example, unconnected nodes or excessively connected nodes and/or accompanying attributes may become readily visible after stacking or after overlaying a stack on the original diagram.

Figure 7:
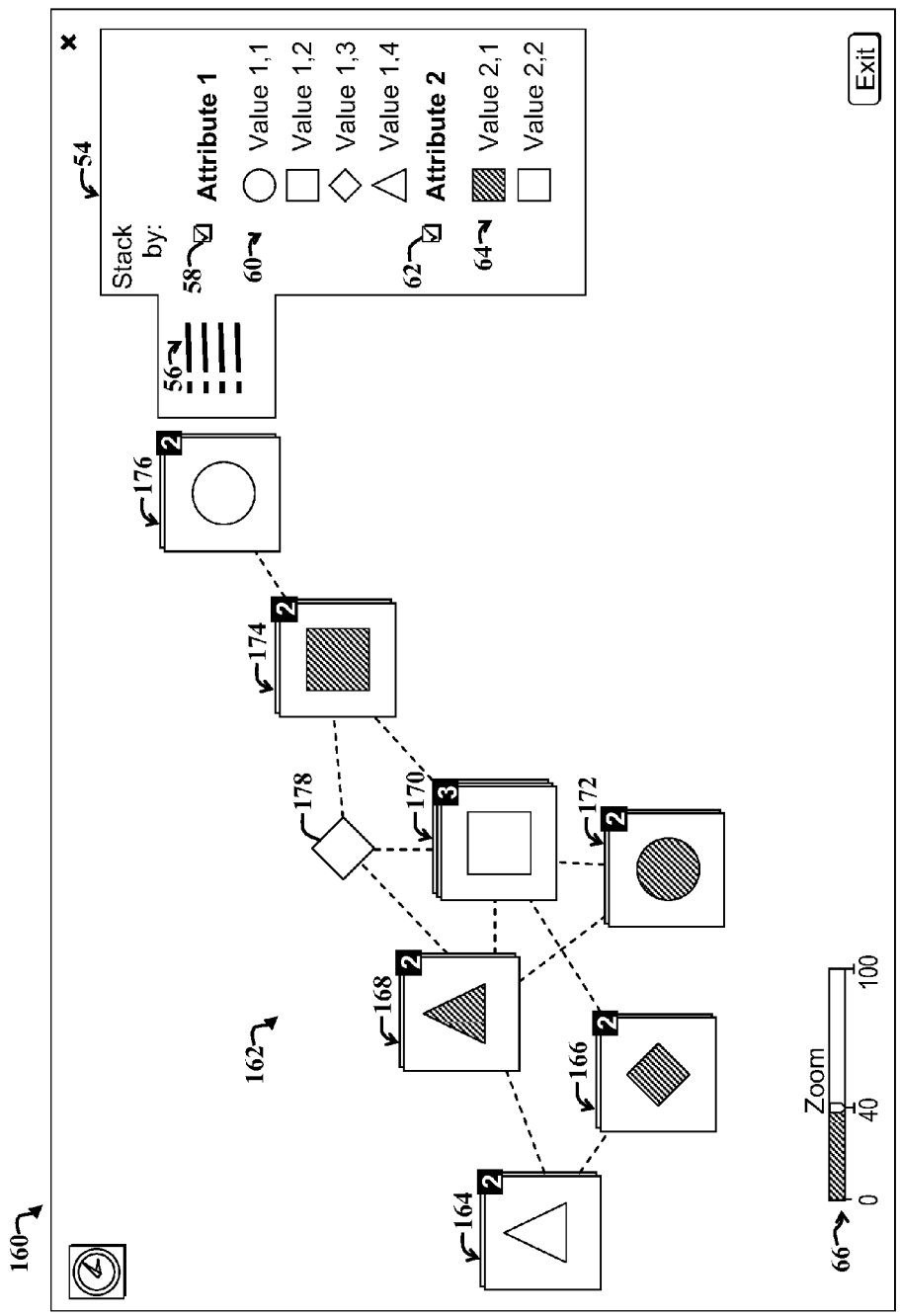
FIG. 7 shows a sixth example user interface display screen illustrating the network diagram of FIG. 2 after a user has specified node stacking criteria by selecting both a first attribute and a second attribute.

FIG. 7 shows a sixth example user interface display screen 160 illustrating the network diagram 52 of FIG. 2 after a user has specified node stacking criteria by selecting both a first attribute and a second attribute, as indicated by the first checked check box 58 and the second checked check box 62, respectively, of the legend 54. This results in display of a third stacked diagram 162, which includes various stacks 164-176 and a node 178. Each of the stacks 164-176 includes nodes that share both the same shape (Attribute 1) and color or shading (Attribute 2). Note that the node 178 represents the only white diamond-shaped node in the original diagram 52 of FIG. 2, and hence, is not included in a stack.

FIG. 8 shows a seventh example user interface display screen 190 illustrating a first example N-box visualization 192, which may be implemented via the system 10 of FIG. 1. For the purposes of the present discussion, an N-box visualization may be any visualization that includes one or more nodes organized into containers, e.g., boxes or other shapes, where links between nodes or containers are not necessarily shown.

The N-box diagram 192 includes different node groups 194-200 arranged in different rectangles or squares. The different nodes of each group 194-200 are color coded in accordance with an attribute, such as an impact-of-loss attribute, which is selectable as a stack attribute via a legend 204 via an impact-of-loss check box 202. Hence, nodes associated with employees that are associated with different categories (e.g., low, medium, or high) of impact-of-loss values will be differently colored and/or shaded.

Figure 9:
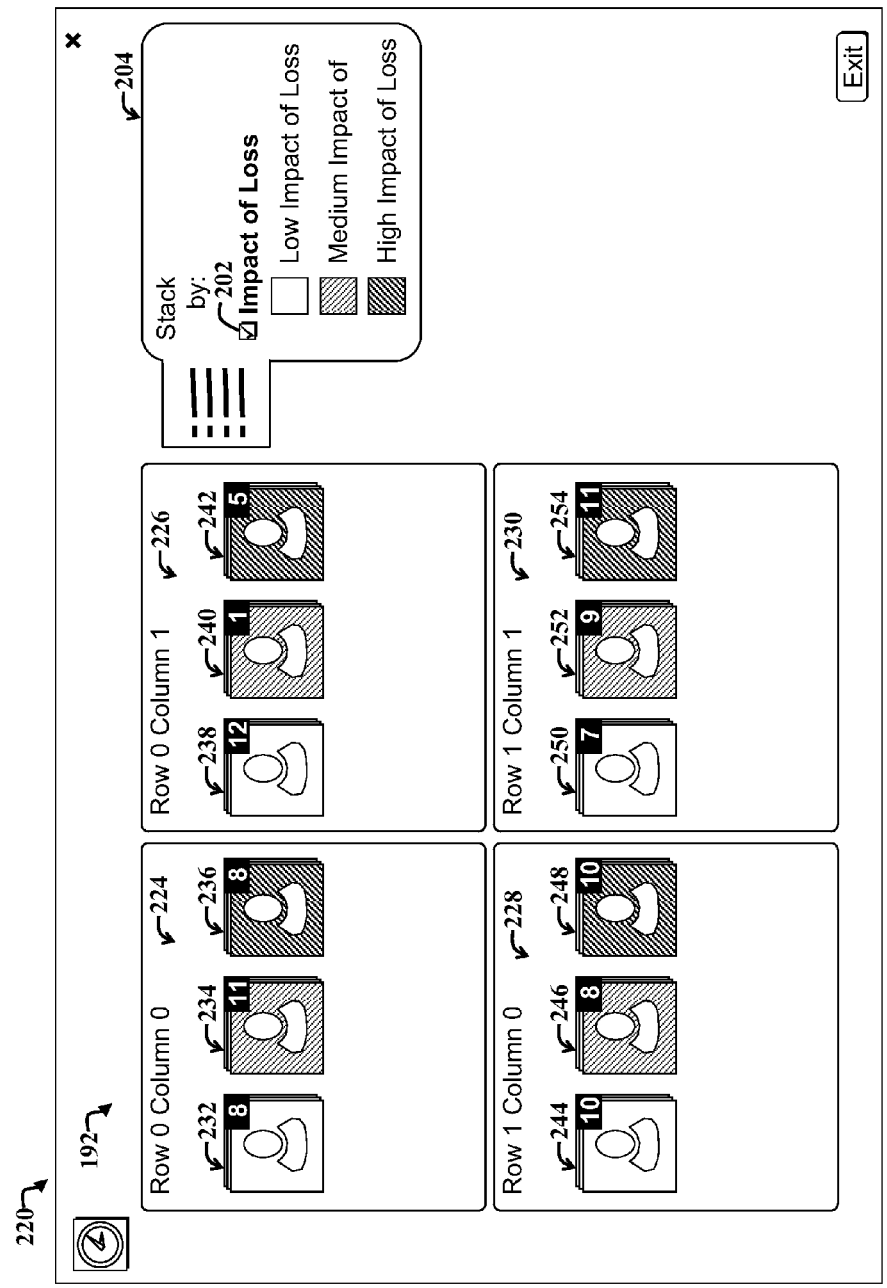
FIG. 9 shows an eighth example user interface display screen illustrating the N-box visualization of FIG. 8 after a user has specified node stacking criteria by selecting an attribute.

FIG. 9 shows an eighth example user interface display screen 220 illustrating the N-box visualization 192 of FIG. 8 after a user has specified node stacking criteria by selecting an attribute, resulting in a stacked N-box visualization 192 with various stack groups 224-230.

Each of the stack groups 224-230 represent each group of nodes 194-200 of FIG. 8 after nodes in each group have been stacked by impact-of-loss. Stacking by impact-of-loss occurs in response to user selection of the impact-of-loss check box 202 in the legend 204.

The stack groups 224-230 include corresponding node stacks 232-254. Each of the stacks 232-254 represents all employees sharing impact-of-loss values within the same impact-of-loss categories in each accompanying stack group 224-230.

Hence, various node stacking methods discussed herein may be applied to different types of diagrams, e.g., to an N-box diagram; not just network diagrams. Furthermore, links (e.g., node-associating information) between nodes need not be represented by physical connecting lines, but may be represented, for example, by sections of a visualization.

Figure 10:
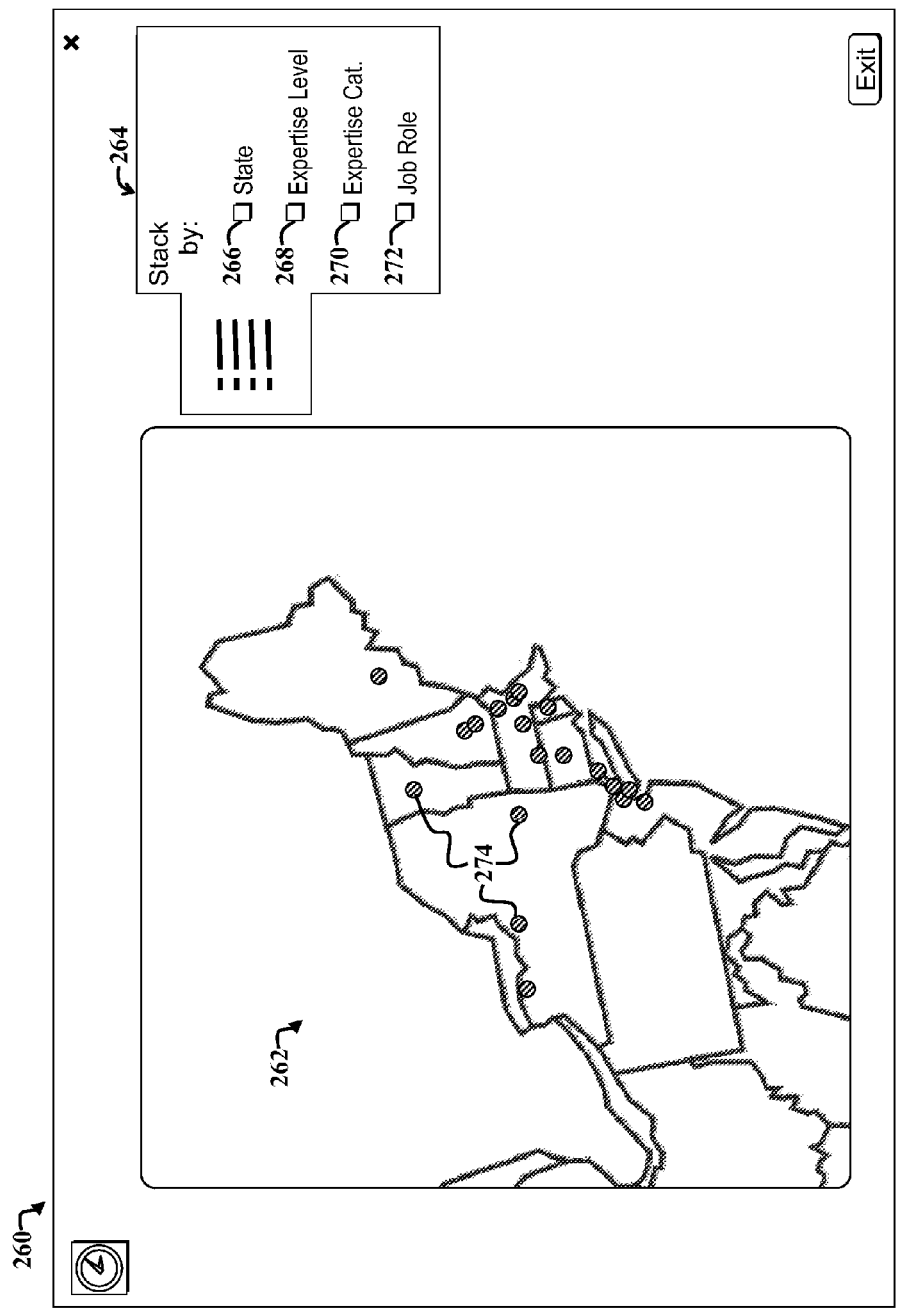
FIG. 10 shows a ninth example user interface display screen illustrating a first example map visualization, which may be implemented via the system of FIG. 1.

FIG. 10 shows a ninth example user interface display screen 260 illustrating a first example map visualization 262, which may be implemented via the system 10 of FIG. 1. The example map visualization 262 includes various nodes 274 positioned on a map of the Northwest corner of the United States.

A map legend 264 includes various check boxes 266-272 for enabling stacking of the nodes 274 by various attributes, including state, expertise level, expertise category, and job role attributes of employees represented by the nodes 274. User selection of one or more stacking attribute check boxes 266-272 may result in stacking of the nodes 274 based on the attributes, as discussed more fully below with reference to FIG. 11.

Figure 11:
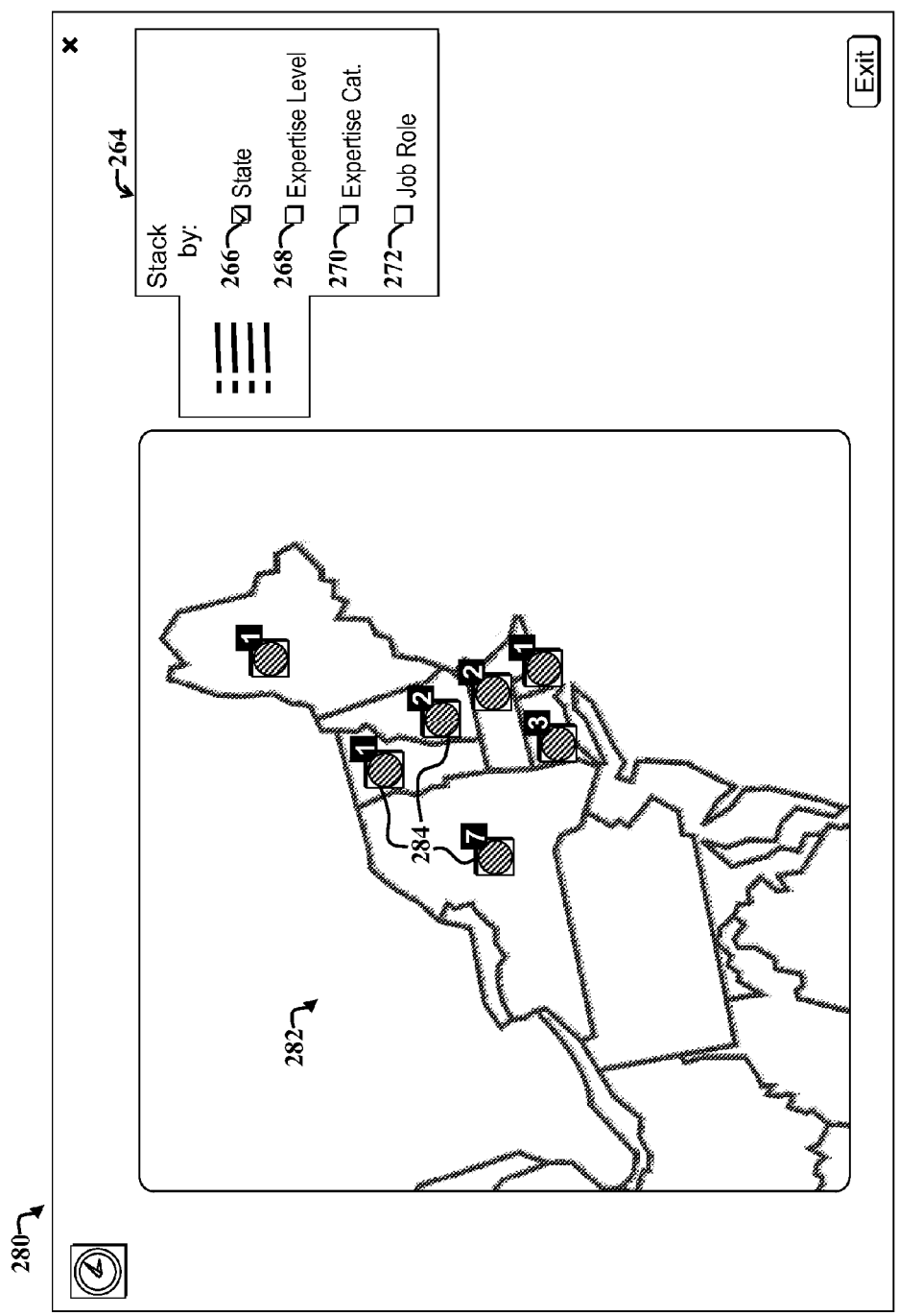
FIG. 11 shows a tenth example user interface display screen illustrating the map visualization of FIG. 10 after a user has specified a node stacking criteria by selecting an attribute.

FIG. 11 shows a tenth example user interface display screen 280 illustrating the map visualization 262 of FIG. 10 after a user has specified a node stacking criteria (e.g., "State") by selecting an associated attribute check box 266, resulting in a stacked map visualization 282.

Nodes 274 of the visualization 262 of FIG. 10, which may overlap and conceal each other, are stacked into various stacks 284 in FIG. 11 in accordance with the state in which a node occurs. Hence, stacking of nodes may reveal additional otherwise obscured information or patterns, such as the number of nodes in a given state, which may otherwise be difficult to discern from an original visualization before stacking is applied.

Figure 12:
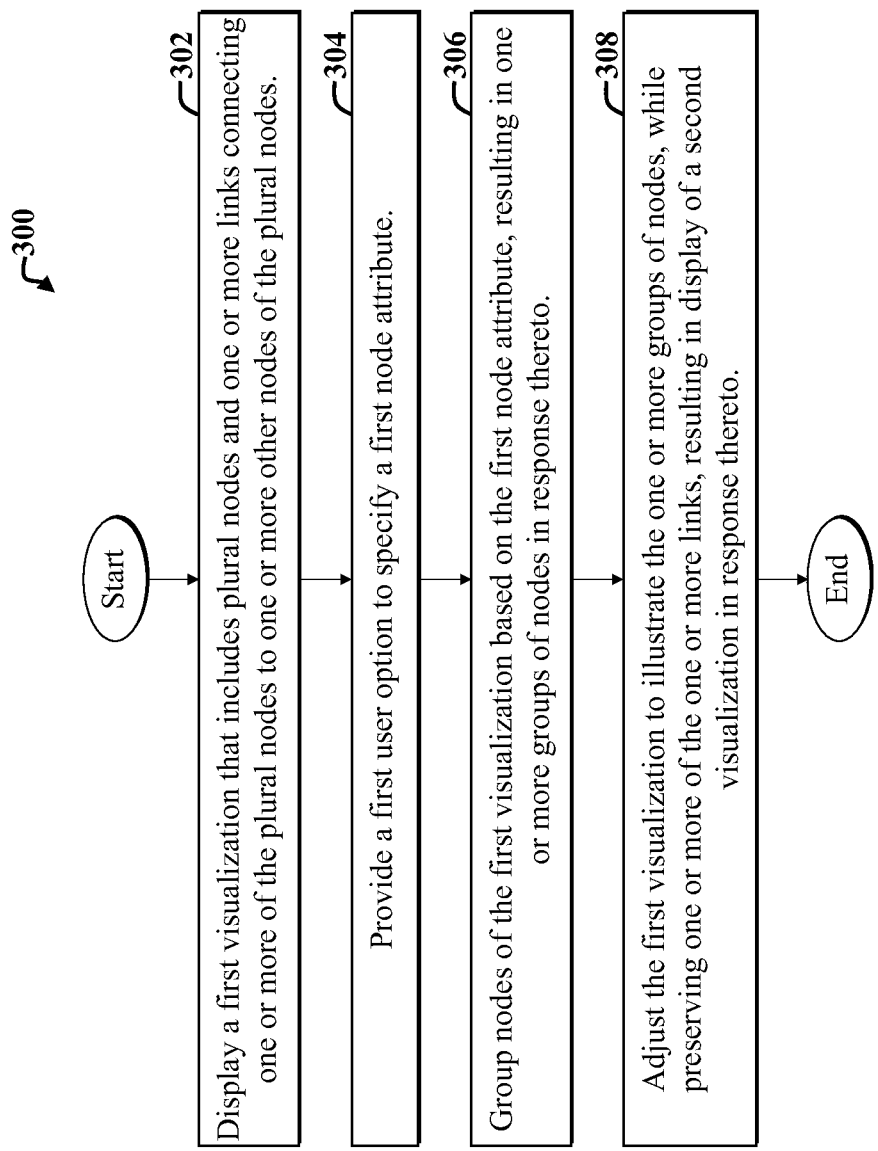
FIG. 12 is a flow diagram of an example method adapted for use with the embodiments of FIGS. 1-4.

FIG. 12 is a flow diagram of an example method 300 adapted for use with the embodiments of FIGS. 1-4. The example method includes a first step 302, which involves displaying a first visualization that includes plural nodes and one or more links connecting or associating one or more of the plural nodes to or with one or more other nodes of the plural nodes.

A second step 304 includes providing a first user option, such as a check box, to specify a first node attribute.

A third step 306 includes grouping nodes (e.g., stacking nodes) of the first visualization based on the first node attribute, resulting in one or more groups of nodes in response thereto.

A fourth step 308 includes adjusting the first visualization to illustrate the one or more groups of nodes, while preserving one or more of the one or more links, resulting in display of a second visualization in response thereto.

Although the description has been described with respect to particular embodiments thereof, these particular embodiments are merely illustrative, and not restrictive. For example, while various embodiments have been discussed with reference to one or more visualizations illustrating enterprise data, embodiments are not limited thereto. In general any type of data that may be organized into nodes associated with different attributes may be illustrated by a visualization, and the nodes may be stacked based on underlying attributes, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A processor implemented method for facilitating adjusting a displayed representation of a visualization, the method comprising:
generating a first visualization that includes plural nodes;
configuring the first visualization to display the nodes and links between the nodes as an interconnection diagram;
providing a first user option to specify a first node attribute;
in response to a selection of the first node attribute, transforming the interconnection diagram of the nodes of the first visualization into a stacked diagram representing separate stacks of nodes stacked according to the first node attribute, wherein each stack of the stacks of nodes is visually represented by an icon portraying a respective stack of nodes as layers of nodes and having an icon height visually representing a number of nodes of the respective stack of nodes, wherein a top layer of the icon includes a first indicator depicting the first node attribute and a second indicator representing the number of nodes in the respective stack of nodes;
determining which of the links connect the nodes disposed within the stacks of nodes; and
transforming the links that connect the nodes disposed within the stacks of nodes into link stacks representing at least one multiple link connection between the stacks of nodes.

2. The method of claim 1, further including:
adjusting the first visualization to illustrate the stacks of nodes, while preserving one or more of the links, resulting in display of a second visualization in response thereto.

3. The method of claim 2, wherein adjusting further includes animating a transition between display of the first visualization and display of the second visualization.

4. The method of claim 3, further including:
providing a second user option to specify a second node attribute;
grouping nodes of the first visualization in accordance with the first node attribute and second node attribute; and
displaying a third visualization, which represents the first visualization after nodes have been stacked in accordance with the first node attribute and the second node attribute.

5. The method of claim 4, further including displaying the icon with edges depicting the layers of nodes, wherein the edges are visually configured to provide an indication of a number of nodes included in a stack of the third visualization.

6. The method of claim 5, wherein the edges visually vary the icon height based on a number of nodes included in the stack.

7. The method of claim 5, further including displaying an indication of a number of links connecting to one or more stacks of the third visualization.

8. The method of claim 3, further including providing a user option to trigger a software action pertaining to one or more nodes of a stack.

9. The method of claim 8, wherein the software action includes generating a fourth visualization based on information associated with the one or more nodes of the stack.

10. The method of claim 9, wherein the fourth visualization includes a bar chart depicting performance of individual persons associated with individual nodes of the stack.

11. The method of claim 8, wherein the software action further includes expanding, sorting, or flipping through nodes of the stack.

12. The method of claim 3, further including providing a user option to overlay a stack on the first visualization while depicting one or more links indicating where one or more of nodes of the stack were originally positioned in the first visualization.

13. The method of claim 4, wherein the first node attribute and the second node attribute are visually encoded in the first indicator representing one or more nodes of the first visualization, and wherein visual encoding for each visually encoded node is preserved between the first visualization and the second visualization.

14. The method of claim 13, wherein the first node attribute is visually encoded by shape, and wherein the second node attribute is visually encoded by color.

15. The method of claim 2, further including providing a user option to filter one or more stacks of nodes from the second visualization.

16. The method of claim 2, wherein the first visualization includes an N-box visualization.

17. The method of claim 1, wherein the first visualization includes a map with one or more nodes positioned thereon, and wherein the first node attribute includes geographical information.

18. The method of claim 17, wherein the first node attribute includes a metric associated with one or more persons represented by one or more nodes displayed on the map.

19. An apparatus comprising:
a digital processor coupled to a display and to a processor-readable storage device, wherein the processor-readable storage device includes one or more instructions executable by the digital processor to perform the following acts:
generating a first visualization that includes plural nodes;
configuring the first visualization to display the nodes and links between the nodes as an interconnection diagram;
providing a first user option to specify a first node attribute;
in response to a selection of the first node attribute, transforming the interconnection diagram of the nodes of the first visualization into a stacked diagram representing separate stacks of nodes stacked according to the first node attribute, wherein each stack of the stacks of nodes is visually represented by an icon portraying a respective stack of nodes as layers of nodes and having an icon height visually representing a number of nodes of the respective stack of nodes, wherein a top layer of the icon includes a first indicator depicting the first node attribute and a second indicator representing the number of nodes in the respective stack of nodes;
determining which of the links connect the nodes disposed within the stacks of nodes; and
transforming the links that connect the nodes disposed within the stacks of nodes into link stacks representing of at least one multiple link connection between the stacks of node.

20. A processor-readable storage device including instructions executable by a digital processor, the processor-readable storage device including one or more instructions for:
generating a first visualization that includes plural nodes;
configuring the first visualization to display the nodes and links between the nodes as an interconnection diagram;
providing a first user option to specify a first node attribute;
in response to a selection of the first node attribute, transforming the interconnection diagram of the nodes of the first visualization into a stacked diagram representing separate stacks of nodes stacked according to the first node attribute, wherein each stack of the stacks of nodes is visually represented by an icon portraying a respective stack of nodes as layers of nodes and having an icon height visually representing a number of nodes of the respective stack of nodes, wherein a top layer of the icon includes a first indicator depicting the first node attribute and a second indicator representing the number of nodes in the respective stack of nodes;
determining which of the links connect the nodes disposed within the stacks of nodes; and
transforming the links that connect the nodes disposed within the stacks of nodes into link stacks representing of at least one multiple link connection between the stacks of nodes.

* * * * *

UNITED STATES PATENT AND TRADEMARK OFFICE
CERTIFICATE OF CORRECTION

| | | |
|---|---|---|
| PATENT NO. | : 9,466,138 B2 | Page 1 of 1 |
| APPLICATION NO. | : 13/905609 | |
| DATED | : October 11, 2016 | |
| INVENTOR(S) | : Singh et al. | |

It is certified that error appears in the above-identified patent and that said Letters Patent is hereby corrected as shown below:

In the Specification

In Column 7, Line 19, before "For" delete "Page: 11".

Signed and Sealed this
Sixth Day of June, 2017

Michelle K. Lee
*Director of the United States Patent and Trademark Office*